(12) United States Patent
Cook et al.

(10) Patent No.: US 6,259,258 B1
(45) Date of Patent: Jul. 10, 2001

(54) METHOD AND TEST UNIT FOR FAR END CROSSTALK MEASUREMENTS

(75) Inventors: Ron Cook, Littleton; Fanny I Mlinarsky, Bolton; James W Kirk, Westborough, all of MA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/358,040

(22) Filed: Jul. 20, 1999

(51) Int. Cl.$^7$ .................................................. G01R 27/28
(52) U.S. Cl. ........................................... 324/628; 324/539
(58) Field of Search .................................... 324/628, 539, 324/533, 616, 172, 91

(56) References Cited

U.S. PATENT DOCUMENTS

| | | | |
|---|---|---|---|
| 4,970,466 | 11/1990 | Bolles et al. ........................ | 324/533 |
| 5,530,367 | 6/1996 | Bottman ............................... | 324/616 |
| 5,532,603 | 7/1996 | Bottman ............................... | 324/628 |
| 5,539,321 | 7/1996 | Sciacero et al. .................... | 324/628 |
| 5,698,985 | 12/1997 | Bottman ............................... | 324/628 |

*Primary Examiner*—Safet Metjahic
*Assistant Examiner*—Vincent Q. Nguyen

(57) ABSTRACT

A test system method for measurement of crosstalk in a multi-pair cable of the type used in local area networks. The system uses a far end signal generator at one end of the cable and a near end signal generator at the near end of the cable. For a far end crosstalk measurement, the far end test unit transmits a high frequency far end test signal and a lower frequency reference signal on one of the wire pairs of the cable. The near end test unit responds to the received reference signal to generate a near end test signal in phase coherency with the far end test signal. A far and crosstalk measurement analysis is then conducted using the received far end test signal, the near end test signal and a crosstalk signal induced by the far end test signal in one of the other wire pairs of the cable.

14 Claims, 4 Drawing Sheets

METHOD AND TEST UNIT FOR FAR END CROSSTALK MEASUREMENTS

FIELD OF THE INVENTION

This invention relates to the measurement of far end crosstalk in a multi-pair cable. In particular, the invention relates to a method and a test unit for providing phase coherent test signals at either end of a cable under test.

BACKGROUND OF THE ART

Crosstalk is the unwanted coupling of signals from one pair to another along a multi-pair cable. When crosstalk is measured at the same end of the cable where the crosstalk originates, the measurement technique is called near end crosstalk (NEXT). Twisted pair LAN technologies, such as 10BASE-T, 100BASE-T, and Token Ring are primarily vulnerable to cable crosstalk problems in a manner that is best tested by measuring the NEXT of the installed cable.

When crosstalk is measured at the end of the cable opposite from where the crosstalk originates, the measurement technique is called far end crosstalk (FEXT). FEXT is measured by applying a test signal to a wire pair at a far end of the cable and measuring the disturbance on the other wire pairs in the cable at the other or near end. It is relevant to specify the FEXT performance of cabling for network technologies, such as the new 1000BASE-T specification, that transmit simultaneously on multiple wire pairs in the same direction.

While it is easy to measure the FEXT performance of an installed multi-pair cable, it is difficult to specify certification limits for such measurements, since FEXT varies with the cable length. The equal level far end crosstalk (ELFEXT) measurement technique was developed as a practical alternative for field certification. Generally, ELFEXT equals FEXT minus attenuation caused by the cable. ELFEXT measurements compensate for the effect of varying cable length so that all installed cable can be certified to the same limit.

Residual crosstalk is any signal that is due to the test instrument itself. Residual crosstalk error must be taken into account in crosstalk measurement analysis.

With vector measurements, residual crosstalk errors can be mathematically cancelled. When an error term cancellation in a vector measurement is employed, the test instruments at either end of the cable need to generate test signals that are phase coherent with one another.

Accordingly there is a need for a method of generating phase coherent test signals at either end of the cable. There is also a need for a test instrument that can be used at either end of the cable and that is capable of producing a test signal that is coherent with another test signal generated at the other end of the cable.

SUMMARY OF THE INVENTION

The method of the invention is used in a system that conducts far end crosstalk measurements of a multi-pair cable that is under test. The system employs a near end test unit and a far end test unit, arranged at opposite ends of the cable. The near and far end test units each have a signal generator.

According to the method of the invention, a first test signal is generated with the far end signal generator and a second test signal is generated with the near end signal generator. The phases of the first and second test signals are synchronized to produce phase coherency of the two signals. The first test signal is transmitted from the far end. A FEXT measurement is performed using the first and second test signals and a crosstalk signal induced by the first test signal in one or more wire pairs of the cable.

In particular, synchronization is accomplished by generating a reference signal with the far end generator in phase synchronization with the first test signal. The reference signal is transmitted from the far end of the cable. At the near end, the near end signal generator is controlled, responsive to the received reference signal, to produce the second test signal in phase coherency with the first test signal.

A test unit in accordance with the invention includes a signal generator that is capable of operating as far end or a near end signal generator to perform the functions of the method described above.

BRIEF DESCRIPTION OF THE DRAWINGS

Other and further objects, advantages and features of the present invention will be understood by reference to the following specification in conjunction with the accompanying drawings, in which like reference characters denote like elements of structure.

DESCRIPTION OF PREFERRED EMBODIMENT

Figure 1:
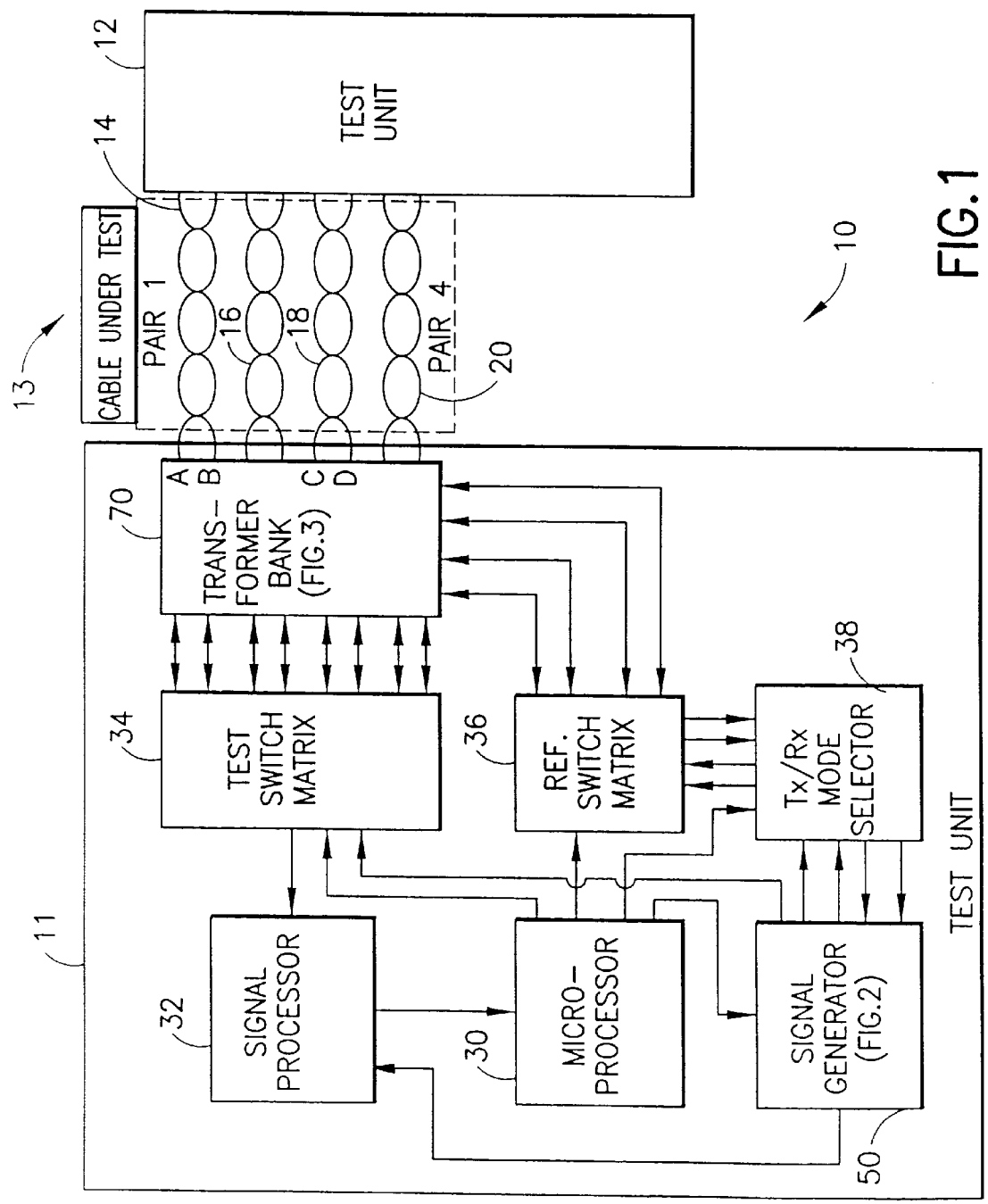
FIG. 1 is a block diagram of a measurement system that uses test instruments according to the present invention.

With reference to FIG. 1, a measurement system 10 includes a first test unit 11 and a second test unit 12 that are connected to opposite ends of a cable 13 that is under test. Cable 13 is a multi-pair cable that has four twisted wire pairs 14, 16, 18 and 20. Cable 13 is of a type that is used in a local area network (LAN) for coupling computer terminals and servers in a network. For the purpose of this description, it is assumed that cable 13 is installed in a LAN and is under test using various measurements, including FEXT and ELFEXT.

Test units 11 and 12 are substantially identical so that they can be used interchangeably at either end of cable 13. Accordingly, only test unit 11 will be described in detail.

Test unit 11 has a microprocessor or controller 30, a signal processor 32, a test switch matrix 34, a reference switch matrix 36, a transmit/receive (Tx/Rx) mode selector 38, a signal generator 50 and a transformer bank 70. Microprocessor 30 directs measurement procedures by communicating with test unit 12 over cable 13, transmitting or receiving signals carried by one or more of twisted wire pairs 14, 16, 18 or 20 and performing a measurement analysis of the signals.

For example, when a measurement procedure requires test unit 11 to transmit a test signal to test unit 12, microprocessor 30 issues a transmit enable signal to signal generator 50, Tx/Rx mode selector 38, reference switch matrix 36 and test switch matrix 34. Signal generator 50 generates a test signal which is applied via test switch matrix 34 and transformer bank 70 to one or more of wire pairs 14, 16, 18 and 20. The test signal is generally a swept frequency signal having a frequency in a range of frequencies, usually in the MHz portion of the spectrum. Crosstalk measurements are generally performed for each frequency in the range.

When a vector measurement method is employed, there is a need for a near end test unit, say unit 11, to replicate locally a test signal that is originally generated by the far end test unit 12 and transmitted via cable 13 to near end test unit 11. The replicated test signal must be substantially identical in frequency and phase coherent with the test signal originally generated by far end test unit 12. That is, the far end and near end test signals must have a constant phase relationship.

To provide phase coherent test signals at either end of cable 13, signal generator 50 generates a reference signal that has a frequency that is substantially lower than the test signal frequency range. For example, the reference signal frequency is generally in the kHz portion of the spectrum. The reference signal is applied via Tx/Rx mode selector 38, reference switch matrix 36 and transformer bank 70 to one or more of twisted wire pairs 14, 16, 18 and 20. The receiving test unit uses the reference signal to locally generate a replica of the test signal generated by the transmitting test unit as described below.

Figure 2:
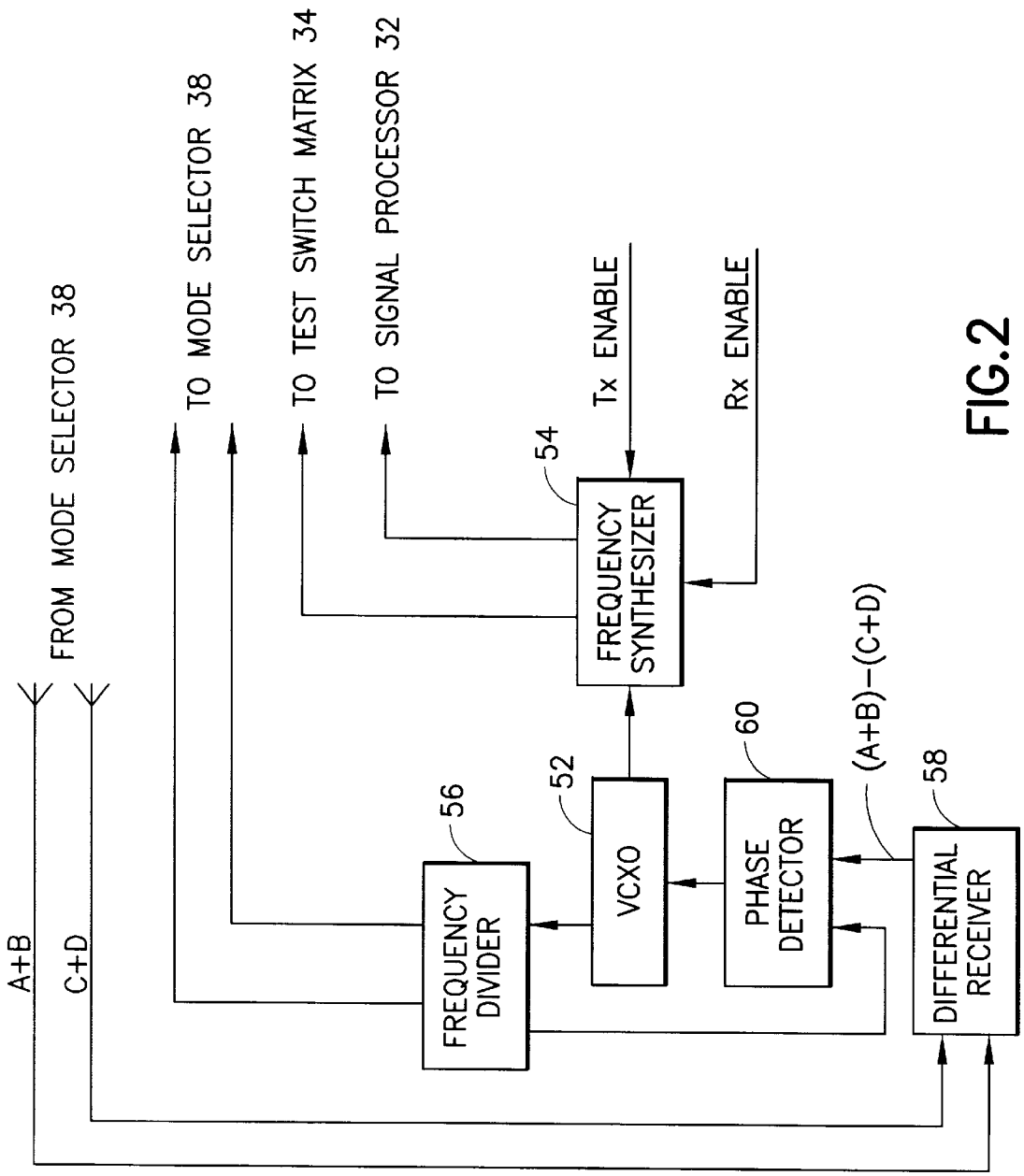
FIG. 2 is a block diagram of the signal generator of the test instrument of the FIG. 1 measurement system.

Referring to FIG. 2, signal generator 50 includes a crystal oscillator 52, a frequency synthesizer 54, a frequency divider 56, a differential receiver or amplifier 58 and a phase detector 60. Crystal oscillator 52 generally operates at a selected design frequency, for example, 15 MHz. The 15 MHz signal is used by frequency synthesizer 54 to generate a test signal and by frequency divider 56 to generate first and second reference signals at a frequency of about 200 kHz. The first and second reference signals are substantially identical, except that they are 180° out of phase.

Test unit 11 is operable in a transmit mode or a receive mode as directed by a transmit enable signal or a receive enable signal issued by microprocessor 30. When in the transmit mode, the transmit enable signal causes the test signal output of frequency synthesizer 54 to be applied to test switch matrix 34. Test switch matrix 34 applies the test signal, via transformer bank 70, to a selected one of the wire pairs 14, 16, 18 or 20 as directed by microprocessor 30, for transmission in a differential mode. The transmit enable signal causes TX/RX mode selector 34 and reference switch matrix 36 to apply the first and second reference signals via transformer bank 70 to two different selected wire pairs for transmission in a common mode. For example, if the test signal is applied to wire pair 14, the first reference signal is applied to wire pair 14 and the second reference signal is applied to a selected one of the other wire pairs 16, 18 or 20.

Figure 3:
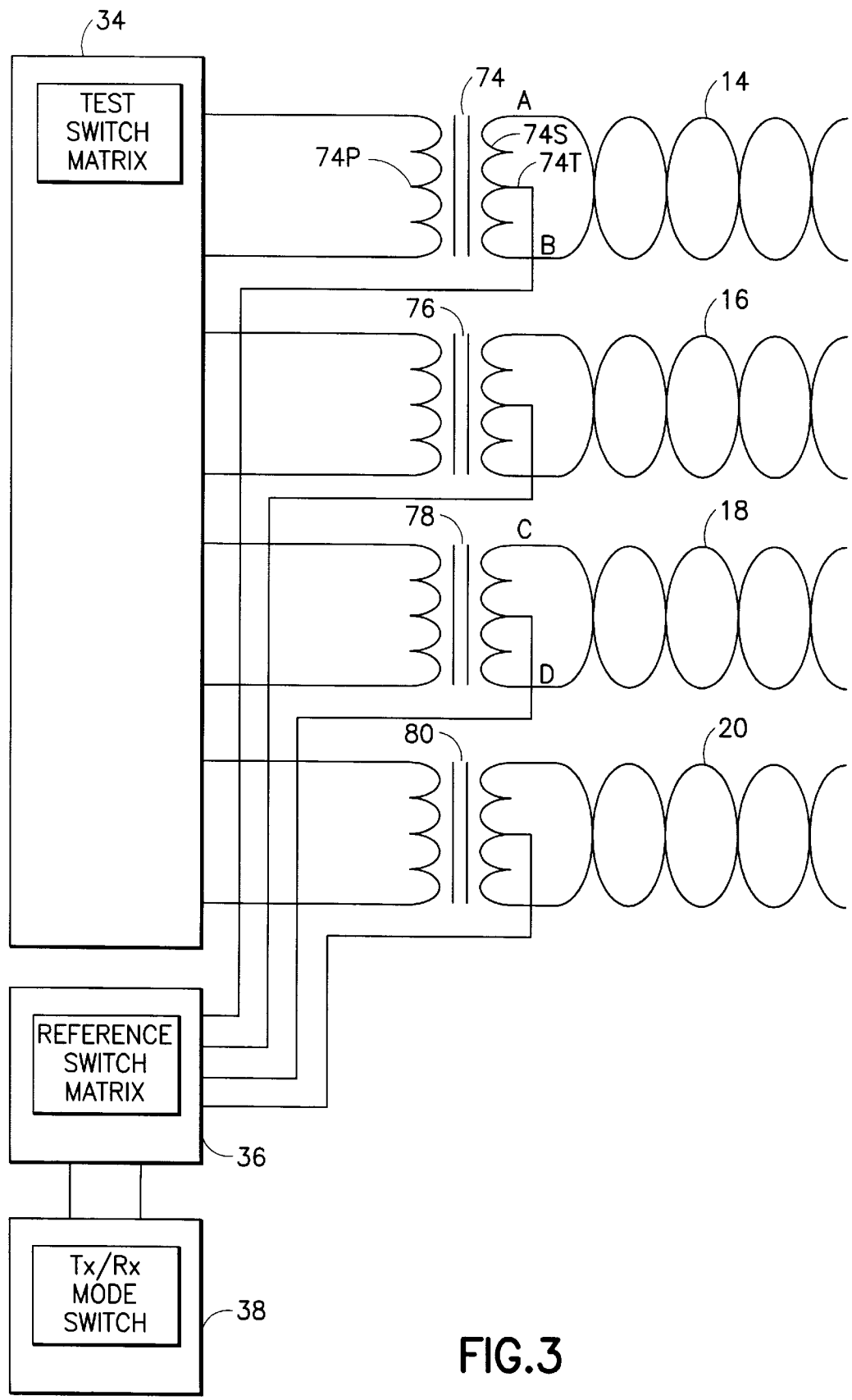
FIG. 3 is a schematic circuit diagram of the transformers of the test instrument of the FIG. 1 measurement system.

Referring to FIG. 3, transformer bank 70 has a plurality of transformers 74, 76, 78 and 80 that are connected to wire pairs 14, 16, 18 and 20, respectively. For example, transformer 74 has a primary winding 74P connected to test switch matrix 34 to receive the test signal. Transformer 74 has a secondary winding 74S that has its end leads connected to separate wires of wire pair 14. These connections result in the test signal being transmitted in a differential mode on wire pair 14, meaning that the test signal is split into two signals on the separate wires that are identical in amplitude and frequency, but are 180° out of phase.

Figure 4:
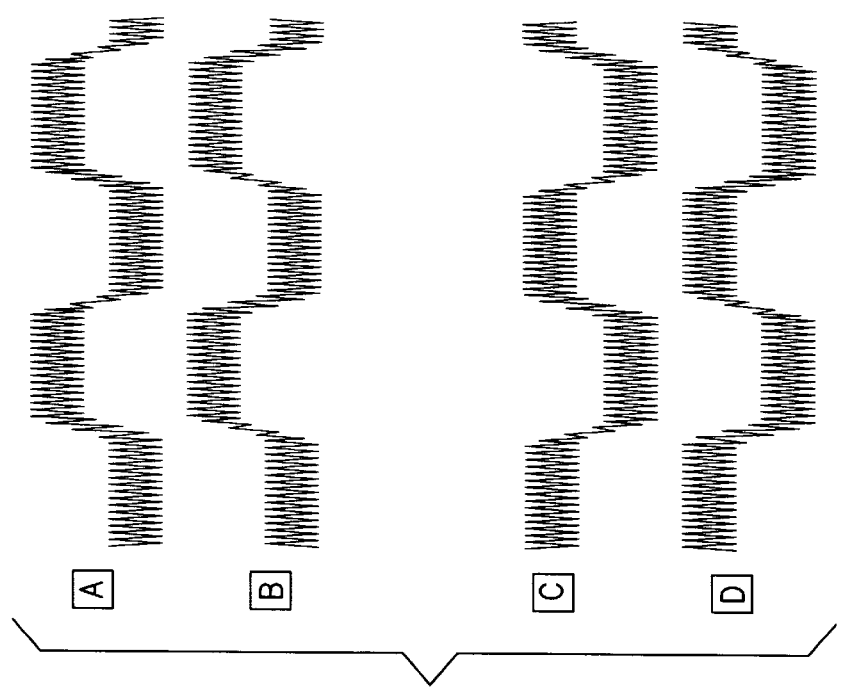

Transformer secondary winding 74S has a center tap 74T that is connected to receive one of the reference signals. This connection results in the reference signal being transmitted on wire pair 14 in a common mode, meaning that the reference signal is split into two signals on the separate wires that are identical in amplitude, frequency and phase. The signals A and B on the two wires represent the composite test and reference signals. The waveforms of signals A and B are shown in FIG. 4. The higher frequency signals A and B are out of phase by 180°.

When in the receive mode, the receive enable signal causes the test signal generated by frequency synthesizer 54 to be applied to signal processor 32. The receive enable signal also enables test switch matrix 34 to transfer signals received from one or more wire pairs to signal processor 32 for signal shaping, filtering and digital conversion processes. Also in the receive mode, reference switch matrix 36 and Tx/Rx mode selector 38 are enabled to transfer the signals received on two of the wire pairs to signal generator 50.

When a FEXT measurement procedure is to be conducted, a far end test unit, say unit 12, generates a test signal and two phase displaced reference signals. The test signal and one of the reference signals are transmitted on a selected wire pair, such as wire pair 14 as signals A and B. This transmission induces crosstalk signals in the other wire pairs 16, 18 and 20. The other reference signal is transmitted simultaneously on one of the other wire pairs, say wire pair 18. The signals C and D represent the composite crosstalk and reference signals on wire pair 18. The waveforms of signals C and D are shown in FIG. 4 with the lower frequency reference signal being the carrier and the higher frequency crosstalk signal modulating the lower frequency carrier. The carriers of signals C and D are 180° out of phase with envelopes of signals A and B due to the 180° phase displacement of the two reference signals.

Figure 5:
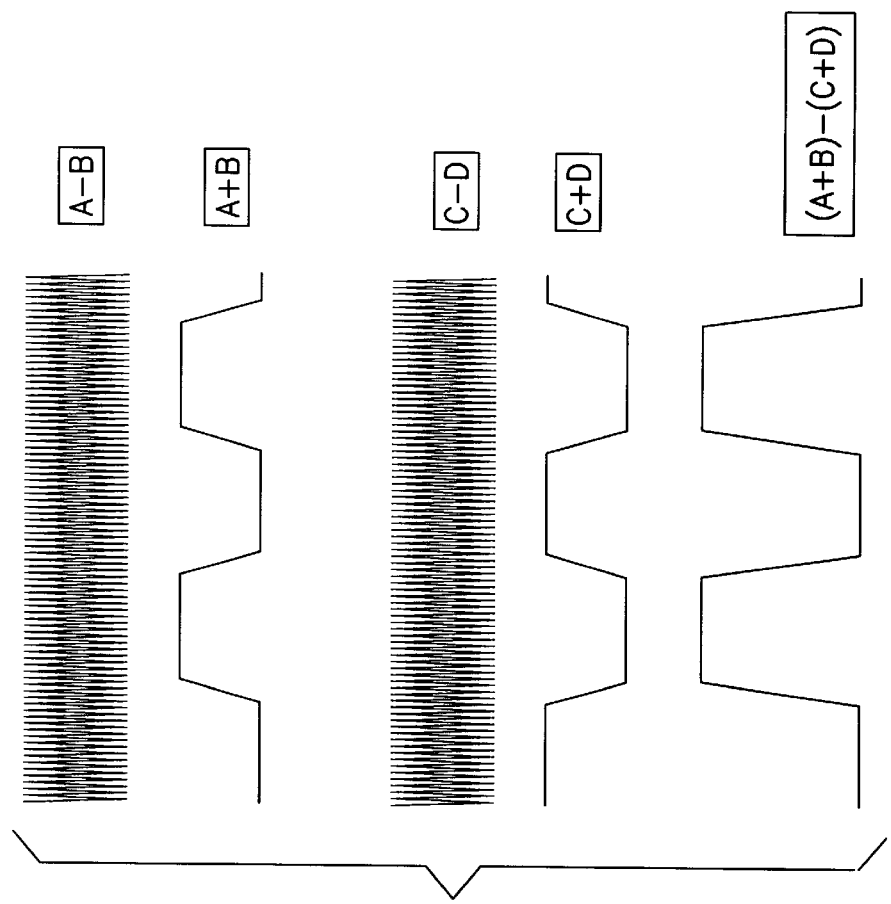
FIGS. 4 and 5 are waveform diagrams of signals identified in FIGS. 2 and 3.

At near end test unit 11, transformer bank 70 acts to separate the carrier signals, A+B and C+D, from the modulating signals, A–B and C–D. The waveforms of these signals are shown in FIG. 5. The carrier signals are then applied to signal generator 50.

Referring to FIG. 2, carrier signals, A+B and C+D, are algebraically summed by differential receiver 58 to produce a difference signal (A+B)–(C+D). The difference signal is applied to phase detector 60 that detects any phase variance between the difference signal and the locally generated 200 kHz reference signal produced by frequency divider 56. The phase variance or error is used to lock oscillator 52 to the phase and frequency of the difference signal. Because of the frequency difference between the difference signal or reference signal and the oscillator, there will be a phase difference at the higher frequency of the received test signal A–B and the locally generated test signal at the output of frequency synthesizer 54. However, due to the phase locking action of oscillator 52, such phase difference will be maintained constant for the period when measurement samples are taken. That is the test signal locally generated by near end signal generator 50 will be phase coherent with the received test signal A–B. These two signals and the crosstalk signal C–D are used by signal processor 32 and microprocessor to perform a FEXT or ELFEXT measurement procedure.

According to the method of the invention, a first or far end test signal (sometimes referred to herein as a first test signal) and first and second reference signals are developed in phase synchronization with one another at the far end of the cable under test. The frequency of the far end test signal is in a relatively high frequency range and the frequency of the reference signals is substantially lower than such high frequency range. The reference signals are phase displaced from one another by 180°. The far end test signal is transmitted in a differential mode and the first reference signal is transmitted in a common mode on a first wire pair of the cable. The second reference signal is transmitted in a common mode on one of the other wire pairs in the cable.

At the receiving end of the cable, the received first and second reference signals are used to develop a second or near end test signal that is phase coherent with the received far end test signal. The far end and near end test signals and a cross talk signal received on a wire pair other than the one that carried the far end test signal are used to perform a far end crosstalk measurement.

The far end and near end signal generators each have an oscillator. The far end oscillator is use to generate the far end test signal and the near end oscillator is used to generate the near end test signal by adjusting the phase of the near end oscillator to the phase of the first and second received reference signals.

The present invention having been thus described with particular reference to the preferred forms thereof, it will be obvious that various changes and modifications may be made therein without departing from the spirit and scope of the present invention as defined in the appended claims.

What is claimed is:

1. A method of compensating for far end crosstalk error in a system that measures crosstalk of a cable under test, said cable having a plurality of wire pairs, each of said plurality of wire pairs having a near end and a far end, said system transmitting a first test signal in a differential mode on a first one of said plurality of wire pairs from said far end and measuring said crosstalk that is induced in one of a remainder of said plurality of wire pairs by said first test signal, said first test signal having a test frequency in a relatively high range of test frequencies, said method comprising:

(a) developing said first test signal, a first reference signal and a second reference signal in phase synchronization with one another, said first and second reference signals having a frequency that is lower than said high range of test frequencies, said first and second reference signals being 180° out of phase;

(b) transmitting said first test signal in a differential mode on said first wire pair from the far end thereof;

(c) transmitting said first reference signal in a common mode on a second one of said plurality of wire pairs from the far end thereof;

(d) transmitting said second reference signal in a common mode on any one of said plurality of wire pairs, except said second wire pair, from the far end thereof;

(e) using said first reference signal received at said near end of said second wire pair and said second reference signal received at said near end of said any one of said plurality of wire pairs to develop a second test signal that is phase coherent with said first test signal; and (f) using said first and second test signals and a cross talk signal received from the near end of said one of the remainder of said plurality of wire pairs to perform a far end cross talk measurement.

2. The method of claim 1, wherein said frequency of said first and second reference signals is substantially lower than said high range of test frequencies.

3. The method of claim 2, wherein said second test signal has the same frequency as said first test signal.

4. The method of claim 3, wherein said system has a near end oscillator and a far end oscillator; and wherein step (a) develops said first test signal and said first and second reference signals from said far end oscillator; and wherein step (e) develops said second test signal by adjusting the phase of said near end oscillator to the phase of said first and second reference signals.

5. A method of conducting far end crosstalk measurement of a cable under test in a system that has a near end test unit and a far end test unit, said cable having a plurality of wire pairs, each of said plurality of wire pairs having a near end and a far end, said near end test unit and said far end test unit being connected to the near and far ends of said plurality of wire pairs, respectively, said near end and far end test units having near end and far end signal generators, respectively, said method comprising:

(a) generating a first test signal with said far end signal generator and a second test signal with said near end signal generator to a frequency synthesizer;

(b) synchronizing the phase of said near end and far end signal generators to produce phase coherency of said first and second test signals using said frequency synthesizer;

(c) transmitting said first test signal to a first one of said plurality of wire pairs; and (d) performing a far end cross talk measurement involving said first and second test signals and a cross talk signal induced by said first test signal in any of said plurality of wire pairs other than said first wire pair.

6. The method of claim 5, wherein said step (b) comprises:

(b1) generating a reference signal with said far end signal generator that is in phase synchronization with said first test signal;

(b2) transmitting said reference signal from said far end of any one of said plurality of wire pairs; and (b3) controlling said near end signal generator to produce said second test signal in phase coherency with said first test signal.

7. The method of claim 6, wherein said first and second test signals have a test frequency that is in a range of relatively high test frequencies and said reference signal has a frequency that is substantially lower than said range of high test frequencies.

8. The method of claim 7, wherein said step (c) transmits said first test signal in a differential mode and said step (b2) transmits said reference signal in a common mode.

9. The method of claim 8, wherein said reference signal is a first reference signal, wherein said far end signal generator generates a second reference signal, and wherein said first and second reference signals have the same frequency and are out of phase with one another by 180°.

10. The method of claim 9, wherein said step (b2) further comprises transmitting said second reference signal in a common mode from said far end of any of said plurality of wire pairs other than said any one wire pair on which said first reference signal is transmitted.

11. A test unit for testing one or more of a plurality of wire pairs for the measurement of far end cross talk, said test unit comprising:

a controller for issuing a transmit enable signal and a receive enable signal;

a signal generator responsive to said transmit enable signal to generate at least one reference signal and a first test signal, said at least one reference signal and said first test signal having the same phase, the frequency of the first test signal being in a range of test frequencies, the frequency of said at least one reference signal being substantially less than the test frequencies of said range;

a switch responsive to said transmit enable signal to transmit (a) said first test signal in a differential mode to a first one of said wire pairs and (b) said reference signal in a common mode to any one of said plurality of wire pairs; said switch responding to said receive enable signal to obtain from one or more of said wire pairs a received test signal and a received reference signal; and wherein said signal generator is responsive to said receive enable signal and to said received reference signal to generate a second test signal that is phase coherent with said received reference signal and said received test signal.

12. The test unit of claim 11, wherein said signal generator is further responsive to said transmit enable signal to generate a second reference signal that is 180° out of phase with said at least one reference signal, and wherein said switch is further responsive to said transmit enable signal to transmit said second reference signal to any one of said plurality of wire pairs other than said any one of said plurality of wire pairs on which said at least one reference signal is transmitted.

13. The test unit of claim 12, wherein said signal generator has a phase lock loop that locks the phase of said second test signal to the phase of said received reference signal in a phase coherent manner.

14. The test unit of claim 13, wherein said signal generator has an oscillator and a frequency synthesizer, said frequency synthesizer being coupled to said oscillator and being operative to generate said first and second test signals, and wherein said phase lock loop controls said oscillator to lock its phase to the phase of said received reference signal.

* * * * *